United States Patent
Enzaki

(10) Patent No.: US 8,997,913 B2
(45) Date of Patent: Apr. 7, 2015

(54) VEHICLE CONTROL DEVICE AND VEHICLE CONTROL METHOD

(75) Inventor: Rumi Enzaki, Sagamihara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 14/113,667

(22) PCT Filed: Mar. 5, 2012

(86) PCT No.: PCT/JP2012/055546
§ 371 (c)(1),
(2), (4) Date: Jan. 2, 2014

(87) PCT Pub. No.: WO2012/147410
PCT Pub. Date: Nov. 1, 2012

(65) Prior Publication Data
US 2014/0117651 A1    May 1, 2014

(30) Foreign Application Priority Data
Apr. 28, 2011   (JP) ................................ P2011-100749

(51) Int. Cl.
| | |
|---|---|
| B60K 28/14 | (2006.01) |
| B60T 7/12 | (2006.01) |
| B60T 8/32 | (2006.01) |
| B60R 21/01 | (2006.01) |
| B60W 10/10 | (2012.01) |
| B60W 10/18 | (2012.01) |
| B60W 30/08 | (2012.01) |
| B60W 10/184 | (2012.01) |

(Continued)

(52) U.S. Cl.
CPC .............. *B60W 10/184* (2013.01); *B60K 28/14* (2013.01); *B60T 7/22* (2013.01); *B60T 2201/024* (2013.01); *B60W 10/11* (2013.01); *B60W 10/182* (2013.01); *B60W 10/10* (2013.01); *B60W 30/08* (2013.01); *B60W 2030/082* (2013.01); *B60R 21/0136* (2013.01)

(58) Field of Classification Search
CPC ......... B60T 7/12; B60T 7/22; B60T 8/17558; B60T 8/32; B60T 2201/024; B60R 2021/01211; B60R 2021/01259; B60W 10/10; B60W 10/18; B60W 10/182; B60W 10/184; B60W 30/08; B60W 2030/082
USPC ............. 180/275, 277; 280/734, 735; 701/45, 701/48, 70
See application file for complete search history.

(56) References Cited

U.S. PATENT DOCUMENTS

| | | | |
|---|---|---|---|
| 3,752,250 A * | 8/1973 | Speer .......................... | 180/275 |
| 3,810,520 A * | 5/1974 | Iwata et al. .................. | 180/282 |

(Continued)

FOREIGN PATENT DOCUMENTS

| | | |
|---|---|---|
| JP | 6-72296 A | 3/1994 |
| JP | 11-235969 A | 8/1999 |

(Continued)

*Primary Examiner* — Paul N Dickson
*Assistant Examiner* — Laura Freedman
(74) *Attorney, Agent, or Firm* — Foley & Lardner LLP

(57) ABSTRACT

A vehicle control device and a vehicle control method automatically bring a vehicle to a halt by operating a brake. Thereafter, when the vehicle stops, a shift position is switched to a parking position by the control of a shift position actuator. This makes it possible to keep the vehicle stopping without any difficulty, and to prevent the vehicle from moving again.

5 Claims, 5 Drawing Sheets

(51) Int. Cl.
  *B60T 7/22* (2006.01)
  *B60R 21/0136* (2006.01)
  *B60W 10/11* (2012.01)

(56) References Cited

U.S. PATENT DOCUMENTS

| | | | | |
|---|---|---|---|---|
| 4,835,693 | A | * | 5/1989 | Smith et al. ............. 701/70 |
| 5,040,633 | A | * | 8/1991 | Donag .................... 180/275 |
| 5,101,927 | A | * | 4/1992 | Murtuza ................. 180/275 |
| 6,105,705 | A | | 8/2000 | Faye |
| 6,286,617 | B1 | * | 9/2001 | DeLuca et al. .......... 180/275 |
| 6,889,786 | B2 | * | 5/2005 | Watanabe et al. ....... 180/167 |
| 7,191,862 | B2 | * | 3/2007 | Wattenburg et al. .... 180/275 |
| 7,209,821 | B2 | * | 4/2007 | Minowa et al. ......... 701/70 |
| 7,401,872 | B2 | * | 7/2008 | Kinder et al. ........... 303/191 |
| 7,493,200 | B2 | * | 2/2009 | Takahashi et al. ...... 701/41 |
| 7,607,741 | B2 | * | 10/2009 | Seto et al. .............. 303/193 |
| 2002/0112912 | A1 | * | 8/2002 | Napier et al. ........... 180/275 |
| 2011/0040454 | A1 | * | 2/2011 | Bonne ..................... 701/48 |

FOREIGN PATENT DOCUMENTS

| | | |
|---|---|---|
| JP | 2000-313323 A | 11/2000 |
| JP | 2004-314848 A | 11/2004 |
| JP | 2007-145313 A | 6/2007 |
| JP | 2008-100603 A | 5/2008 |
| JP | 2008-126962 A | 6/2008 |

* cited by examiner

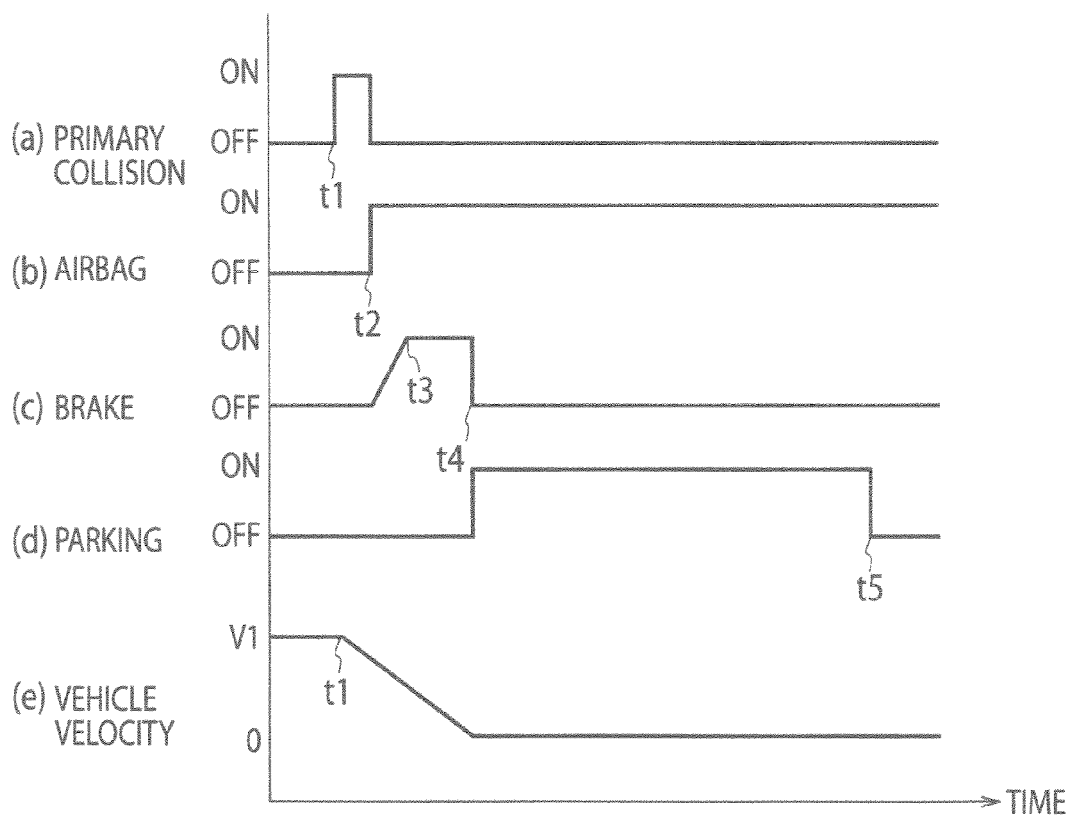

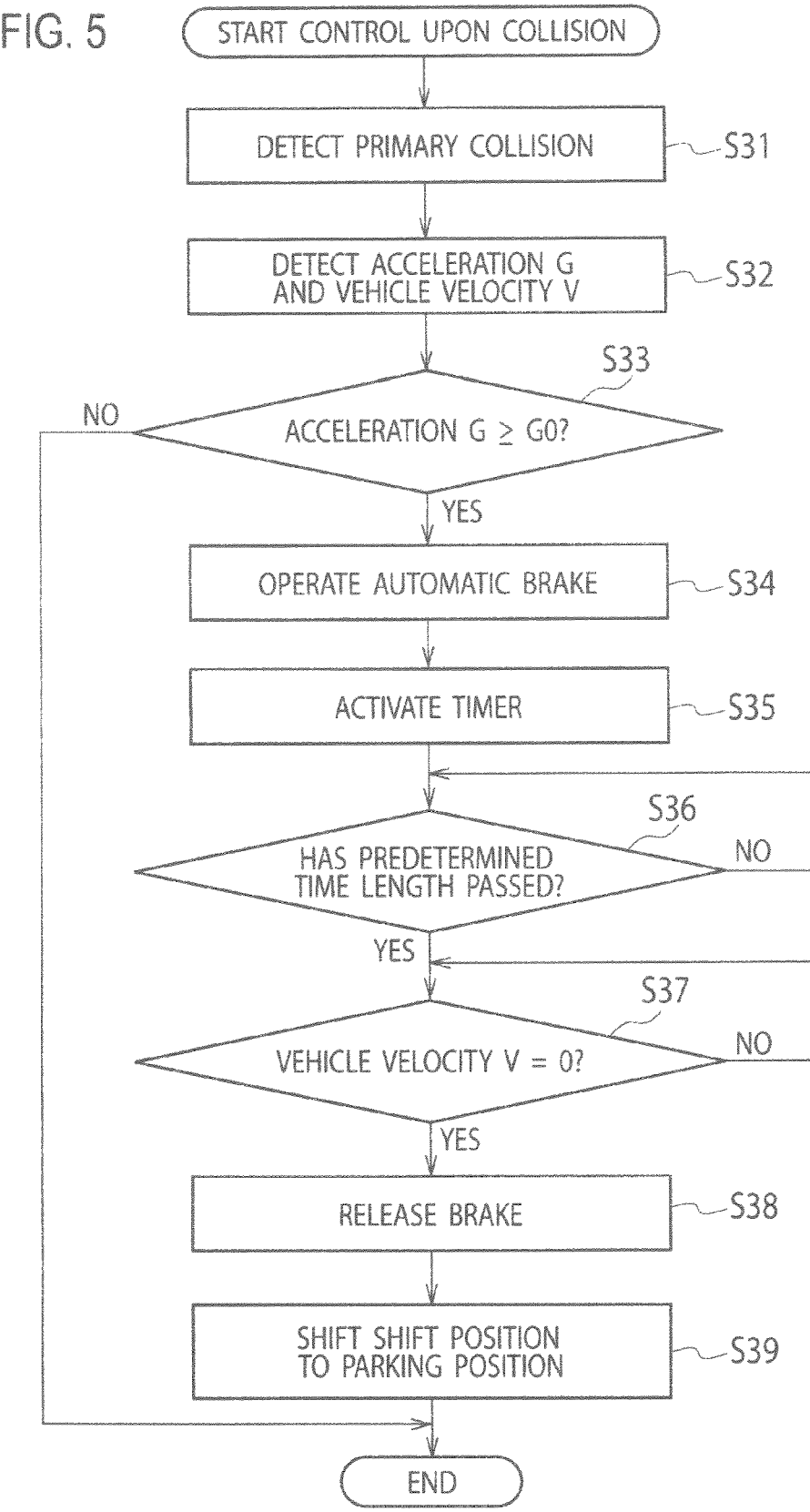

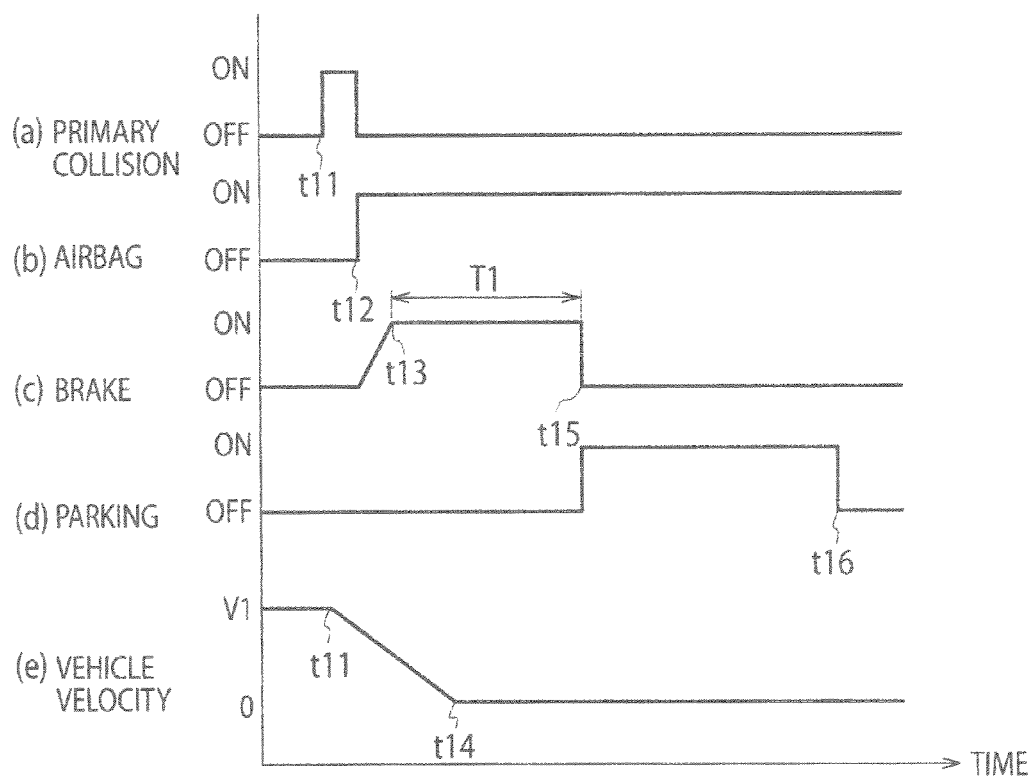

VEHICLE CONTROL DEVICE AND VEHICLE CONTROL METHOD

TECHNICAL FIELD

The present invention relates to a vehicle control device and a vehicle control method which stably keep a vehicle stopping once the vehicle is brought to a halt by operating an automatic brake.

BACKGROUND ART

A proposal has been made on a brake control device configured to avoid a secondary collision by automatically operating a brake and thereby bringing a vehicle to a halt quickly once the vehicle is involved in a collision (a primary collision) (see Patent Literature 1). The technology disclosed in Patent Literature 1, however, is designed to automatically release the braking by the automatic brake after the vehicle is brought to a halt by operating the automatic brake, so that the driver can move the vehicle at will after the vehicle is brought to a halt. For this reason, the vehicle is more likely to to move due to the inclination and the like of the road surface.

Against this background, it is conceivable that the braking is made to continue without releasing the automatic brake in order to solve the foregoing problem. In this case, however, the braking system has to continue producing high hydraulic pressure, and it is accordingly difficult to keep the vehicle stopping for a long time after the collision. Furthermore, it may be conceived to adopt a method of electrically operating the brake in order to solve the problem. If, however, the power supply is discontinued due to an impact of the collision, it is most likely that the brake cannot be kept operating.

CITATION LIST

Patent Literature

Patent Literature 1: Japanese Patent Application Publication No. Hei 11-235969

SUMMARY OF INVENTION

As described above, the technology disclosed in Patent Literature 1 can bring the vehicle to a halt quickly and thereby avoid the occurrence of a secondary collision by operating the automatic brake once the vehicle is involved in a collision. Nevertheless, the technology disclosed therein has a problem that: the vehicle cannot be kept stopping for a long time after the collision; and the vehicle may start to move, for example, due to the inclination and the like of the road surface.

The present invention has been made to solve the foregoing problems. An object of the present invention is to provide a vehicle control device and a vehicle control method with which a vehicle having been brought to a halt by the operation of an automatic brake can be kept stopping for a long time.

To attain the object, a vehicle control device of a first aspect of the present invention includes: an automatic brake control unit configured to automatically bring a vehicle to a halt by operating a brake once the vehicle is involved in a collision; and a shift position switching unit configured to switch a shift position to a parking position after the vehicle stops due to operation of the brake by the automatic brake control unit.

Meanwhile, a vehicle control method of a second aspect of the present invention includes: bringing a vehicle to a halt by automatically operating a brake once the vehicle is involved in a collision; and switching a shift position of the vehicle to a parking position after the vehicle stops.

BRIEF DESCRIPTION OF DRAWINGS

FIG. 4 is a timing chart showing how signals change in the vehicle control device of the first embodiment of the present invention.

FIG. 5 is a flowchart showing how the vehicle control device of a second embodiment of the present invention operates.

FIG. 6 is a timing chart showing how signals change in the vehicle control device of the second embodiment of the present invention.

DESCRIPTION OF EMBODIMENTS

Figure 1:
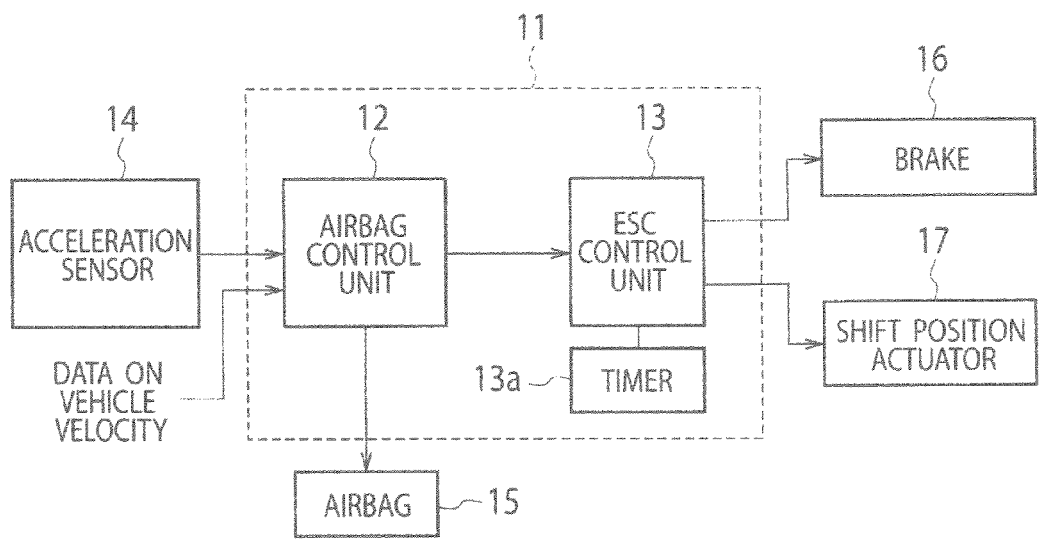
FIG. 1 is a block diagram showing a configuration of a vehicle control device of embodiments of the present invention.

Descriptions will be hereinbelow provided for embodiments of the present invention on the basis of the drawings. As shown in FIG. 1, vehicle control devices of the embodiments each include: a controller 11 including an airbag control unit 12 and an ESC control unit (Electronic Stability Control) 13; an acceleration sensor 14 configured to detect the acceleration which takes place in the vehicle; an airbag 15 configured to protect an occupant by operating under control of the airbag control unit 12 in the case of a vehicle collision; a brake 16 configured to bring the vehicle to a halt in response to a braking signal outputted under control of the ESC control unit (automatic brake controlling means, automatic brake control unit) 13 if the vehicle is involved in the collision; and a shift position actuator (shift position switching means, shift position switching unit) 17 configured to switch the shift position of an automatic transmission installed in the vehicle.

The airbag control unit 12 protects the occupant by deploying the airbag 15 by outputting a drive signal to the airbag 15 if the acceleration detected by the acceleration sensor 14 exceeds a predetermined threshold value.

If the acceleration detected by the acceleration sensor 14 exceeds the threshold value for activating the airbag 15, the ESC control unit 13 judges that the vehicle is involved in a collision, and thus performs control to bring the vehicle to a halt by outputting the braking signal to the brake 16. In addition, once the vehicle is automatically brought to a halt by the operation of the brake 16, the ESC control unit 13 thereafter performs control to switch the shift position to a parking position by outputting an operation signal to the shift position actuator 17.

Figure 2:
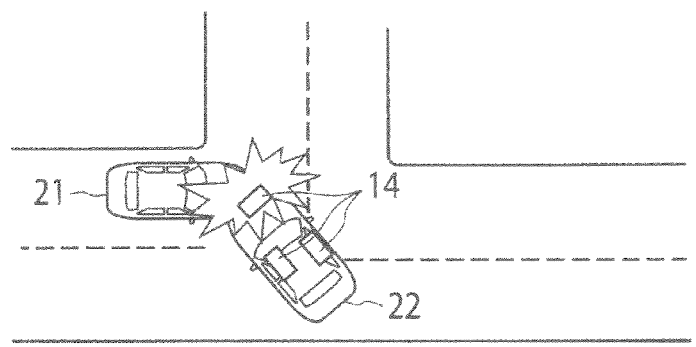
FIG. 2 is an explanatory diagram showing how vehicles collide with each other at an intersection.
Figure 3:
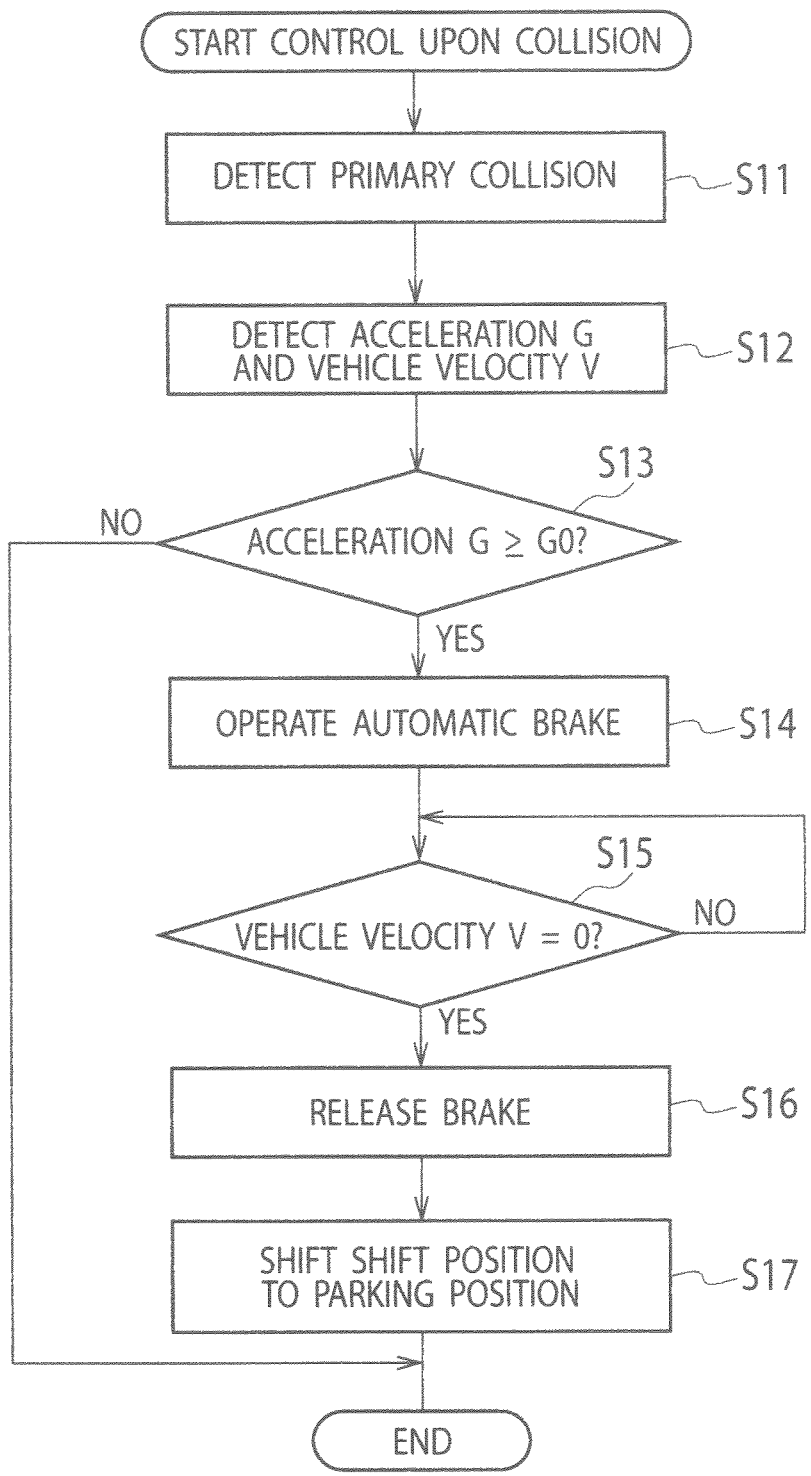
FIG. 3 is a flowchart showing how the vehicle control device of a first embodiment of the present invention operates.

Next, referring to a flowchart shown in FIG. 3, descriptions will be provided for how the vehicle control device of a first embodiment of the present invention operates. First of all, in step S11, the ESC control unit 13 detects from the acceleration detected by the acceleration sensor 14 that the vehicle is involved in a primary collision. Thereafter, in step S12, the acceleration and the vehicle velocity V at the time of the primary collision are detected. An example of the occurrence of the primary collision is that, as shown in FIG. 2, a vehicle 22 collides with a straight oncoming vehicle 21 when the vehicle 22 is about to turn to the right at an intersection. In this case, the acceleration G is detected by the acceleration sensor 14, and the vehicle velocity V is acquired by a speedometer installed in the vehicle 22.

In step S13, the ESC control unit 13 judges whether or not the acceleration G is equal to or greater than a predetermined acceleration threshold value G0. If G≥G0 (If YES in step S13), the process proceeds to step S14. If G<G0 (if NO in step S 13), the ESC control unit 13 terminates the current process without operating the brake 16.

In step S14, the ESC control unit 13 brings the vehicle to a halt by outputting the brake signal to the brake 16. To put it specifically, the ESC control unit 13 has a function as the automatic brake controlling means for automatically bringing the vehicle to a halt by operating the brake once the vehicle is involved in a collision. Simultaneously, the airbag control 12 deploys the airbag 15 by outputting the drive signal.

Subsequently, in step S15, the ESC control unit 13 judges whether or not the vehicle velocity V becomes equal to 0 km/h. If the vehicle velocity V becomes equal to 0 km/h, that is to say, if the vehicles stops (if YES in step S15), the ESC control unit 13 releases the braking by the brake 16 in step S16.

Thereafter, in step S17, the ESC control unit 13 switches the shift position to the parking position by transmitting the control signal to the shift position actuator 17. As a result, the vehicle is kept stopping even after the release of the brake 16. To put it specifically, the shift position actuator 17 has a function as the shift position switching means for switching the shift position to the parking position after the vehicle stops as the result of the operation of the brake by the automatic brake controlling means.

Next, referring to a timing chart shown in FIG. 4, descriptions will be provided for how the first embodiment operates. In FIG. 4, Part (a) represents the timing at which the vehicle is involved in a primary collision; Part (b) represents how the airbag 15 operates; Part (c) represents how the brake 16 operates; Part (d) represents how the parking position is set; and Part (e) represents the vehicle velocity.

Once the vehicle is involved in a primary collision at time t1 shown in Part (a) of FIG. 4, the airbag 15 is activated at time t2 shown in Part (b). Thereafter, as shown in Part (c), the brake 16 is automatically activated, and goes into full braking mode at time t3. In response to this, as shown it Part (e), the vehicle velocity gradually slows down and becomes equal to 0 km/h at time t4. Then, as shown in Part (d), the shift position is set to the parking position. In this manner, once the primary collision occurs, the vehicle can be brought to a halt by operating the brake 16 automatically, and thereafter can be kept stopping by switching the shift position to the parking position.

As described above, in the vehicle control device of the embodiment, when the vehicle automatically stops in response to the occurrence of the primary collision, the shift position is subsequently set into the parking position. This makes it possible to keep the vehicle stopping after the collision. For this reason, even in the case of the inclination or the like of the road surface, it is possible to avoid the problem that the vehicle starts to move again. In addition, since the vehicle control device does not use a configuration which operates the brake by continued production of high hydraulic pressure, the vehicle control device can reliably keep the vehicle stopping even if the vehicle stops for a long time.

Next, descriptions will be provided for a vehicle control device of a second embodiment of the present invention. The configuration of the vehicle control device is the same as that shown in FIG. 1, but the second embodiment is different from the first embodiment in that the controller 11 includes a timer 13a. The rest of the configuration is the same as that of the first embodiment. For this reason, descriptions for the rest thereof will be omitted. Referring to a flowchart shown in FIG. 5, descriptions will be provided for how the vehicle control device of the second embodiment operates.

First of all, in step S31, the ESC control unit 13 detects from the acceleration detected by the acceleration sensor 14 that the vehicle is involved in a primary collision. Thereafter, in step S32, the acceleration G and the vehicle velocity V at the time of the primary collision are detected.

In step S33, the ESC control unit 13 judges whether or not the acceleration G is equal to or greater than the predetermined acceleration threshold value G0. If G>G0 (If YES in step S33), the process proceeds to step S34. If G<G0 (if NO in step S 33), the ESC control unit 13 terminates the current process without operating the brake 16.

In step S34, the ESC control unit 13 outputs the brake signal to the brake 16. Simultaneously, the airbag control unit 12 deploys the airbag 15 by outputting the drive signal.

In step S35, the ESC control unit 13 activates the timer 13a. Furthermore, the ESC control unit 13 judges in step S36 whether or not the time length measured by the timer 13a reaches a predetermined time length T1.

Thereafter, if the predetermined time length T1 passes (if YES in step S36), the ESC control unit 13 judges in step S37 whether or not the vehicle velocity V becomes equal to 0 km/h. If the vehicle velocity V becomes equal to 0 km/h, that is to say, if the vehicle stops (if YES in step S37), the ESC control unit 13 releases the braking by the brake 16 in step S38.

After that, in step S39, the ESC control unit 13 switches the shift position to the parking position by transmitting the control signal to the shift position actuator 17. As a result, the vehicle is kept stopping even after the brake 16 is released.

Next, referring to a timing chart shown in FIG. 6, descriptions will be provided for how the above-described second embodiment operates. In FIG. 6, Part (a) represents the timing at which the vehicle is involved in a prim collision; Part (b) represents how the airbag 15 operates; Part (c) represents how the brake 16 operates; Part (d) represents how the parking position is set; and Part (e) represents the vehicle velocity.

Once the vehicle is involved in a primary collision at time t11 shown in Part (a) of FIG. 6, the airbag 15 is activated at time t12 shown in Part (b). Thereafter, as shown in Part (c), the brake 16 is automatically activated, and goes into full braking mode at time t13. In response to this, as shown in Part (e), the vehicle velocity gradually slows down and becomes equal to 0 km/h at time t14. Subsequently, at time t15 when the predetermined time length T1 has passed since time t13 when the brake 16 goes into full braking mode, the brake 16 is released and the shift position is set into the parking position as shown in Part (d). In this manner, once the primary collision occurs, the vehicle is brought to a halt by automatically operating the brake 16; thereafter, the operation of the brake 16 is continued for the predetermined time length T1; and subsequently, the shift position is set to the parking position. The vehicle can be kept stopping in this way.

As described above, once the vehicle automatically stops in response to the occurrence of the primary collision, the vehicle control device of the second embodiment continues the operation of the brake for the predetermined time length T1, and thereafter sets the shift position to the parking position. For this reason, if the driver wishes to perform some driving operation after the vehicle stops, the vehicle control device enables the driver to perform the driving operation at once. Furthermore, since the shift position is set to the parking position once the predetermine time length T1 has passed, the vehicle can be kept stopping after the occurrence of the primary collision.

Although the foregoing descriptions have been provided for the contents of the present invention on the basis of the embodiments, the present invention is not limited to what have been described above. It is obvious to those skilled in the art that various modifications and improvements can be made to the present invention.

For example, although the foregoing embodiments use the acceleration which triggers the operation of the airbag 15 as the condition for automatically operating the brake 16, the present invention is not ted to this configuration. The brake 16 may be automatically operated on the basis of an arbitrarily set acceleration.

All the contents of Japanese Patent Application Publication No. 2011-100749 (filed on Apr. 28, 2011) are incorporated herein.

INDUSTRIAL APPLICABILITY

The vehicle control devices and the vehicle control methods of the embodiments of the present invention can keep the vehicle stopping without any difficulty, since the vehicle control devices and the vehicle control methods bring the vehicle to a halt by operating the automatic brake once the vehicle is involved in a collision, and then release the automatic brake and switch the shift position to the parking position. For this reason, the vehicle control devices and the vehicle control methods of the embodiments of the present invention are industrially applicable.

REFERENCE SIGNS LIST

13 ESC control unit (automatic brake controlling means, automatic brake control unit)
13*a* timer
16 brake
17 shift position actuator (shift position switching means, shift position switching unit)

The invention claimed is:

1. A vehicle control device comprising:
   an automatic brake control unit configured to automatically bring a vehicle to a halt by automatically operating a brake once the vehicle is involved in a collision; and
   a shift position switching unit configured to automatically release the brake and to switch a shift position to a parking position after the vehicle is brought to the halt due to operation of the brake by the automatic brake control unit.

2. The vehicle control device according to claim 1, further comprising:
   a timer configured to measure a time length which has passed since the operation of the brake by the automatic brake control unit starts,
   wherein the shift position switching unit automatically releases the brake and switches the shift position to the parking position once a predetermined time length has passed since the operation of the brake by the automatic brake control unit starts.

3. The vehicle control device according to claim 1, further comprising:
   an airbag control unit configured to deploy an airbag simultaneously with automatically bringing the vehicle to the halt by automatically operating the brake once the vehicle is involved in the collision.

4. A vehicle control method comprising:
   bringing a vehicle to a halt by automatically operating a brake once the vehicle is involved in a collision; and
   automatically releasing the brake and switching a shift position of the vehicle to a parking position after the vehicle is brought to the halt.

5. A vehicle control device comprising:
   automatic brake controlling means for automatically bringing a vehicle to a halt by automatically operating a brake once the vehicle is involved in a collision; and
   shift position switching means for automatically releasing the brake and for switching a shift position to a parking position after the vehicle is brought to the halt due to operation of the brake by the automatic brake controlling means.

* * * * *